Figure 1:
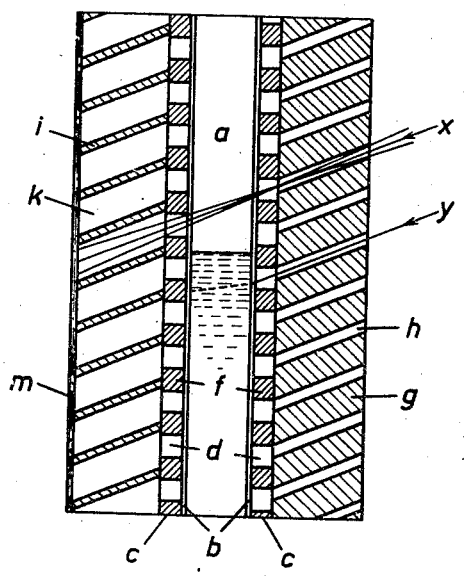

March 26, 1940.     M. VERMOHLEN     2,194,625
LIQUID LEVEL GAUGE
Filed June 20, 1939

Inventor
Martin Vermohlen
By
Attorney

Patented Mar. 26, 1940

2,194,625

UNITED STATES PATENT OFFICE 2,194,625

LIQUID LEVEL GAUGE

Martin Vermöhlen, Aachen, Germany

Application June 20, 1939, Serial No. 280,185
In Germany February 14, 1938

1 Claim. (Cl. 73—293)

This invention relates to liquid level gauges, especially designed for use on steam boilers, which comprises a body member having a fluid chamber therein with longitudinal openings at the front and rear face covered by thin mica sheets, the indication of the level taking place by what may be called the "bright-dark effect," an effect based on the difference in refraction of light rays passed through liquid and gaseous media.

In the known gauges of this type the mica sheets in order to give them sufficient resistance against the internal pressures of the gauge are backed by metal plates or grates provided for the passage of the light with a series of parallel horizontal or inclined slots or with one narrow vertically extending slot. The slots at the rear side are of such arrangement and form as to cause beams of light emerging from a lamp arranged behind the gauge for illuminating it to strike on the liquid column in the fluid chamber at an acute angle so that they are deflected. The space in the gauge above the liquid which contains steam, air or gas, as the case may be, is traversed by the light rays practically without any deflection. The slots in the front backing grate are disposed relatively to those in the rear backing grate in such a manner that the light rays entering the steam or gas filled space of the fluid chamber through the slots of the rear face issue through corresponding slots at the front so that this space appears bright, while the rays entering the liquid filled space of the fluid chamber through the slots at the rear are so deflected that they are intercepted by the solid portions of the front grate, whereby the liquid filled space appears dark to an observer. The relative adjustment of the grates may also be made so that the steam or gas space appears dark and the liquid space bright.

However, the effect striven for is rather unsatisfactory, first because the contrast between bright and dark is not sufficiently strong due to stray light that may emerge from the dark space, and secondly because the range within which accurate readings can be taken by the observer is comparatively limited. For improving the effect of the gauges in question, it has been proposed to arrange on the back side of the rear grate a thick screen having narrow and relatively long light guiding channels in juxtaposition with the slots of the rear grate, by which guide channels the light beams are prevented from diverging and dispersing laterally and the formation of stray light is reduced. But this measure alone proved insufficient to secure the desired effect.

The invention has for its object to remove the said difficulties and drawbacks completely and to provide a gauge of the type indicated having a sharp bright-dark effect and a wide range of observation.

According to the invention, the light introduced at the rear of the gauge by narrow guide channels after passing through the fluid chamber and through the slots of the front grate is received by relatively large guide channels which are arranged to form a continuation of the rear light guiding channels and which collect and lead the light onto a transparent body arranged ahead of the channels and consisting for example of a frosted glass plate acting as a diffuser. This body or plate reproduces the bright-dark effect with a surprising sharpness, the bright portion on the said plate having a particularly high degree of brightness and acting so strongly light diffusing that it is distinctly visible within a wide range.

Figure 2:
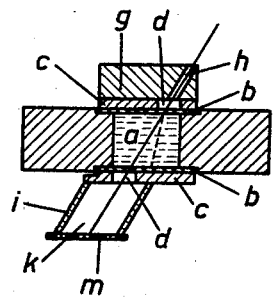

In order that the invention be more readily understood it will now be described with reference to the accompanying drawing in which:

Fig. 1 is a vertical longitudinal section through a portion of a water level gauge according to the invention with which the mica sheets are held by backing grates each having a series of parallel horizontal or inclined slots, and Fig. 2 is a horizontal cross-section of another form of gauge with which the grates each have a vertically extending narrow slot.

It is assumed that the two gauges, which are merely illustrated by way of example, are used on a boiler and are connected to the water and steam spaces of the boiler in any approved well-known manner.

With the embodiment according to Fig. 1, the letter $a$ denotes the fluid chamber of the gauge body which contains in part water and in part steam, the water level varying in accordance with the fluctuations of the water in the boiler. The chamber $a$ has the usual oblong openings at the front and rear side which are covered by mica sheets $b$. These mica sheets are held on the gauge body by metal backing plates $c$ in the form of grates having alternate slots $d$ and webs $f$. These front and rear grates are adjusted with relation to each other in such a manner that light entering for instance at $x$ from a suitable source, such as an electric lamp, after passing without any appreciable deflection through the steam space issues freely through a corresponding slot d of the front grate c, while light entering at y into the liquid space is deflected so as to be intercepted by the webs f of the front grate c. Disposed on the rear grate c is a thick light-guiding screen g for the incoming light, which has relatively long narrow guide channels h lying in juxtaposition with the slots of the rear grate. Arranged on the front face of the front mica backing grate is another light-guiding screen i having channels k which in a way constitute continuations of the rear guide channels h and extend up to a frosted glass plate m. The channels h and k are preferably closed at their sides to avoid lateral dispersion of the light. The guide channels k are much larger than the rear guide channels h. They collect the light issuing from the slots d of the front grate c in a diffused condition and project it onto the fronted glass plate m. In the region of the liquid space of the gauge the channels h are effective in intercepting or absorbing any stray light that might issue from the slots of the front grate within the said region so that the liquid space appears very dark. The screen i with the glass plate m also affords the advantage of forming a certain protection against outflowing steam and hot water in case a fracture of the front mica sheet should occur.

With the embodiment according to Fig. 2, in which the parts corresponding to those of Fig. 1 are denoted by the same reference letters, the mica sheets b are held by backing plates c which have each a vertically extending uninterrupted or interrupted narrow slot d. The light is introduced at the back through a narrow inclined channel h extending vertically in longitudinal direction in a member g which corresponds to the screen g of Fig. 1. In the steam space of the gauge the light entering through the channel h and the slot d of the rear backing plate c passes without deflection to and issues from the slot d of the front backing plate c, as is indicated by a full line. In the liquid space of the gauge the incoming light, indicated by a dotted line, is deflected and intercepted in the chamber a especially by the solid portions of the front backing plate c. Disposed in front of the last-said plate is a broad light guiding channel i, k which collects the issuing light and leads it to a frosted glass plate m on which the same effect is produced as on the glass plate m of Fig. 1.

Having thus described my invention, what I claim as new and desire to secure by Letters-Patent, is:—

A liquid level gauge, comprising a body member, a fluid chamber therein, longitudinal sight openings in the front and rear wall of the said chamber for allowing the gauge to be observed and light to pass from the rear into and through the gauge, mica sheets on the said openings, a metal backing plate on the rear mica sheet, slots in this backing plate for allowing the ingress of light therethrough, a screen on the rear backing plate having narrow light guiding channels in juxtaposition to the slots of the rear backing plate with these channels disposed at such an inclination as to introduce the light at an acute angle into the fluid chamber, a metal backing plate on the front mica sheet, slots in this front backing plate corresponding in number to the slots of the rear backing plate and disposed relatively to these slots in such a manner as to allow light rays passing from the rear through one of the fluids of the fluid chamber to issue through the slots of the front backing plate and to cause the light rays passing from the rear through the other fluid of the fluid chamber to be intercepted by the solid portions of the front backing plate, a screen on the face of the front backing plate having broad light guiding channels corresponding in number, direction and position to the channels of the rear screen so as to form enlarged continuations of the last said channels, and a transparent light diffusing member on the front face of the said front screen.

M. VERMÖHLEN.